(12) United States Patent
Archibald et al.

(10) Patent No.: US 7,829,031 B2
(45) Date of Patent: Nov. 9, 2010

(54) METHODS AND SYSTEMS FOR MULTISTAGE PROCESSING OF FLUIDIZED PARTICULATE SOLIDS

(75) Inventors: Robert J. Archibald, Glen Rock, NJ (US); H. Kenneth Staffin, Colonia, NJ (US); Edward P. Traina, Sayreville, NJ (US); Edward A. Wales, Edison, NJ (US)

(73) Assignee: Brunob II B.V., Arnhem (NL)

( * ) Notice: Subject to any disclaimer, the term of this patent is extended or adjusted under 35 U.S.C. 154(b) by 361 days.

(21) Appl. No.: 11/941,644

(22) Filed: Nov. 16, 2007

(65) Prior Publication Data
US 2009/0130004 A1   May 21, 2009

(51) Int. Cl.
*B01J 8/18* (2006.01)
(52) U.S. Cl. .............. 422/142; 422/139; 422/147; 423/350; 127/1; 127/23; 127/28; 127/34; 127/65; 127/71; 210/323.1; 210/348; 210/472
(58) Field of Classification Search .............. 422/141, 422/142, 139, 147; 34/209, 210–212, 218–219, 34/224–225, 588–589; 110/245; 423/350; 127/1, 23, 28, 34, 65, 71; 210/348, 323.1, 210/472
See application file for complete search history.

(56) References Cited

U.S. PATENT DOCUMENTS

| | | | |
|---|---|---|---|
| 2,892,772 A | 6/1959 | McAfee | |
| 3,391,913 A * | 7/1968 | Jones, II | 432/58 |
| 3,745,668 A * | 7/1973 | Vian-Ortuno et al. | 34/589 |
| 4,068,389 A | 1/1978 | Staffin et al. | |
| 4,517,162 A * | 5/1985 | Moss | 422/142 |
| 4,828,486 A * | 5/1989 | Sakamoto et al. | 431/170 |
| 5,169,913 A | 12/1992 | Staffin et al. | |
| 5,198,029 A * | 3/1993 | Dutta et al. | 118/303 |
| 5,218,932 A * | 6/1993 | Abdulally | 122/4 D |
| 5,264,196 A | 11/1993 | Tanaka et al. | |
| 5,378,434 A | 1/1995 | Staffin et al. | |
| 5,423,370 A | 6/1995 | Bonnemasou et al. | |
| 5,568,834 A * | 10/1996 | Korenberg | 165/104.16 |
| 5,796,018 A | 8/1998 | Moyer et al. | |

(Continued)

FOREIGN PATENT DOCUMENTS

EP    1 072 855 A1    1/2001

(Continued)

*Primary Examiner*—Walter D Griffin
*Assistant Examiner*—Huy-Tram Nguyen
(74) *Attorney, Agent, or Firm*—Karen G. Kaiser

(57) ABSTRACT

Methods and systems for continuous multistage processing of particulate solids that can control the distribution of residence times of processed particles. One disclosed method includes admitting fluidizing gas into transfer tunnels between fluidized bed vessel stages, using gas inlets located in or outputting directly into the transfer tunnel to promote flow of the fluidized solids through the transfer tunnel. A common gas distributor plate can supply gas to the stage vessels and to any transfer tunnels having gas inlets. The distributor plate can be separable from the system or openable to provide access for removal of obstructions and for maintenance. A common base plate can incorporate lower portions of the stage vessels and the sides and roofs of the transfer tunnels, the bottoms of the vessels and tunnels optionally being provided by the gas distributor plate. Some multistage systems and processing methods have from 15 to 200 or more stages.

16 Claims, 11 Drawing Sheets

U.S. PATENT DOCUMENTS

| | | | | |
|---|---|---|---|---|
| 6,122,842 | A | * | 9/2000 | Arima et al. .................. 34/582 |
| 6,253,830 | B1 | | 7/2001 | Bickford et al. |
| 6,506,048 | B1 | | 1/2003 | Staffin et al. |
| 6,991,767 | B1 | | 1/2006 | Staffin et al. |
| 2004/0229182 | A1 | | 11/2004 | Dachauer et al. |

FOREIGN PATENT DOCUMENTS

| | | |
|---|---|---|
| GB | 891648 | 3/1962 |
| WO | WO 86/02912 | 5/1986 |
| WO | WO 2004/097055 A2 | 11/2004 |

* cited by examiner

METHODS AND SYSTEMS FOR MULTISTAGE PROCESSING OF FLUIDIZED PARTICULATE SOLIDS

STATEMENT REGARDING FEDERALLY SPONSORED RESEARCH OR DEVELOPMENT (Not applicable.)

The present invention relates to methods and systems for multistage processing of fluidized particulate solids. More particularly, but not exclusively, the invention relates to methods and systems wherein particulate solids are continuously processed in a series of stage vessels each of which employs a pressurized gas flow to fluidize the particulate solids.

BACKGROUND OF THE INVENTION

For processes involving interactions between particulate solids and a gas phase, fluidizing the solids with the gas phase is often a useful approach to accomplish processing objectives. Many commercial processes employ fluidized bed technology in a variety of ways including, for example, for performing gas-solids reactions, for polymerizations, chemical depositions, calcining, drying, for activation of catalysts and for other processes. Many of these processes employ dense phase handling, especially solids fluidization, because of the favorable performance characteristics fluidized solids procedures can provide with respect to heat transfer, mass transfer, reaction kinetics, physical handling, physical size, particulate solids transport and/or other factors. These factors can often provide cost-effective processing yielding high quality products.

A variety of fluidized methods and apparatus are known for processing fluidized solids. Some of these are shown in FIGS. 1-3 of the accompanying drawings which are described in detail below. For example, a continuous processing method can be carried out by continuously supplying particulate solids into an upper portion of a fluidized bed processing vessel, discharging the particulate solids from the other side of the processing vessel and supplying fluidizing gas through the bottom of the vessel to cause the particulate solids to fluidize.

Another processing apparatus comprises a number of stage vessels connected together in series by transfer tunnels extending between each stage vessel and its neighbor. Each stage vessel receives its own supply of fluidizing gas to generate a fluidized bed of the particulate solids. The solids product to be processed can be fed continuously into the first stage vessel at a desired constant volumetric production rate. The solid particle populations traveling through the system have a residence time which depends upon the shape and size of the individual stages as well as the volumetric flow rate.

In many fluidized bed processes, the residence time of the solid particles in the system is important and desirably should be predictable and uniform for all solids particles traversing the system. However, in practice, these goals may be difficult or impossible to meet owing to bypassing and holdback phenomena which cause some solid particles to follow shorter than average paths through the system, and other solid particles to follow longer than average paths through the system. Consequently, there is usually a significant variation in residence times of solid particles processed.

Accordingly, it would be desirable to provide methods and systems for fluidized bed continuous processing of particulate solids which can better control the distribution of the residence times of particles processed.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

The present invention provides new methods and systems for continuous multistage processing of particulate solids. Embodiments of the invention can provide good control of the distribution of the residence times of particles processed, and can, provide additional benefits, in some cases.

In one aspect, the invention provides a method for continuous multistage processing of particulate solids which comprises feeding particulate solids to a first stage vessel in a series of stage vessels, admitting fluidizing gas into each of the stage vessels to fluidize particulate solids in the stage vessels and transporting the fluidized solids from the first stage vessel to the other stage vessels through transfer tunnels connecting adjacent stage vessels together, and discharging particulate solids from a last stage vessel in the series of stage vessels. The method further comprises admitting fluidizing gas into each transfer tunnel through at least one fluidizing gas inlet located in the transfer tunnel. The transfer tunnel fluidizing gas can promote flow of the fluidized solids through the transfer tunnel from one stage to an adjacent stage and help avoid obstructions.

In another aspect the invention provides a method for continuous multistage processing of particulate solids, comprising supplying particulate solids to a first stage vessel in a series of at least fifteen stage vessels, admitting fluidizing gas into each of the stage vessels to fluidize particulate solids present in the stage vessels, transporting the fluidized solids from the first stage vessel to other stage vessels in the series through transfer tunnels connecting adjacent stage vessels one to another and discharging particulate solids from a last stage vessel in the series of stage vessels.

If desired, the fluidizing gas can be admitted to each transfer tunnel in a direction transverse to the direction of transportation of fluidized solids through the transfer tunnel so as to impact a transfer tunnel wall opposite to the location of a fluidizing gas inlet in the transfer tunnel. Some embodiments of the invention comprise supplying fluidizing gas to each gas inlet from a common plenum chamber. Method embodiments of the invention can comprise circulating a heating or cooling medium around each stage vessel to heat or cool the fluidized solids in the stage vessels.

One method embodiment of the invention comprises interacting the fluidizing gas with the fluidized particulate solids during transport through the stage vessels. Another comprises reacting the fluidizing gas with the fluidized particulate solids during transport through the stage vessels, the fluidizing gas and the solids being chemically reactive with each other.

The invention also provides multistage systems for continuous processing of fluidized particulate solids comprising at least two stage vessels arranged side-by-side, each stage vessel comprising a containing wall to contain the fluidized solids, a solids inlet for the fluidized solids, a solids outlet for the fluidized solids, at least one gas inlet for fluidizing gas, and a gas outlet for the fluidizing gas. The system also comprises at least one transfer tunnel, each transfer tunnel connecting between two adjacent stage vessels to permit transport of fluidized solids between the two adjacent stage vessels.

In one system aspect of the invention, the multistage system comprises a common integral gas distributor plate extending across and forming the bottoms of the at least two stage vessels. The gas distributor plate can communicate with a fluidizing gas supply and can comprise the fluidizing gas inlets of the at least two stage vessels.

In another system aspect of the invention, the multistage system comprises an integral or unitary base plate comprising a lower portion of each stage vessel containing wall and comprising top and side walls for the or each transfer tunnel.

In a further system aspect of the invention, the multistage system comprises a plenum chamber extending beneath the at least two stage vessels and the at least one transfer tunnel to supply fluidizing gas to the gas inlets wherein each gas inlet can communicate with the plenum chamber to receive fluidizing gas from the plenum chamber. These several aspects of the multistage systems of the invention can of course be variously combined in one system.

If desired, a system embodiment of the invention can comprise at least ten stage vessels arranged side-by-side and the gas distributor plate can extend across and form the bottoms of a majority of the stage vessels. The gas distributor plate can also comprise the gas inlets of the majority of the stage vessels, if desired.

In some embodiments of the invention the or each transfer tunnel comprises at least one transfer tunnel gas inlet for fluidizing gas. This feature can help transport the particulate solids through the transfer tunnel or tunnels. Optionally, the gas distributor plate forms the bottom of the transfer tunnel and comprises the at least one transfer tunnel gas inlet. This feature provides a convenient and efficient structure for furnishing a transfer tunnel with a gas inlet. If desired, the transfer tunnel gas inlet or gas inlets can inject fluidizing gas directly into the transfer tunnel.

In some system embodiments of the invention the multistage system comprises at least twenty stage vessels arranged side-by-side and the gas distributor plate extends across and forms the bottoms of all the stage vessels and supports the gas inlets to all the stage vessels. The multistage system can comprise fifty or more stage vessels. Depending upon the particular configuration of stage vessels employed, which can vary, the number of transfer tunnels can in some embodiments be one less than the number of stage vessels.

If desired, a multistage system according to the invention can comprise a unitary base plate. The unitary base plate can comprise a lower portion of each stage vessel containing wall and top and side walls for the transfer tunnel or tunnels. In one useful embodiment of the invention, the gas distributor plate can extend beneath the unitary base plate and close the bottoms of the stage vessels and the transfer tunnels. Also, if desired, the gas distributor plate can be removably attachable to the unitary base plate, or movable away from the base plate, to provide access to the stage vessels and transfer tunnels for service and maintenance.

To enhance the range of processing capabilities, embodiments of the multistage system can comprise temperature control structures, for example, a volume extending around each stage vessel which can receive temperature control fluid for controlling the temperature of the fluidized solids in the respective stage vessel. If desired the system can comprise a temperature control fluid enclosure enclosing the volumes around the stage vessels, which optionally can be divided into multiple sub-regions controllable to have different temperatures, one sub-region from another sub-region.

By providing, in some embodiments, an integrated multistage system for processing fluidized particulate solid materials wherein fluidized bed stage vessels and interconnecting transfer tunnels are integrated on a common platform, the invention enables systems having an abundance of processing stages to operate efficiently with regard to factors such as throughput, pressure drop and residence time distribution. The common platform can be provided, for example, by a robust base plate which incorporates portions of the stage vessels and transfer tunnels. A one-piece gas distributor plate, having gas supply openings to communicate with a gas source, can underlie the base plate and provides a floor extending across the bottom of each stage vessel and transfer tunnel.

BRIEF DESCRIPTION OF THE SEVERAL VIEWS OF THE DRAWING

Some embodiments of the invention, and of making and using the invention, as well as the best mode contemplated of carrying out the invention, are described in detail herein and, by way of example, with reference to the accompanying drawings, in which like reference characters designate like elements throughout the several views, and in which.

DETAILED DESCRIPTION OF THE INVENTION

Figure 1:
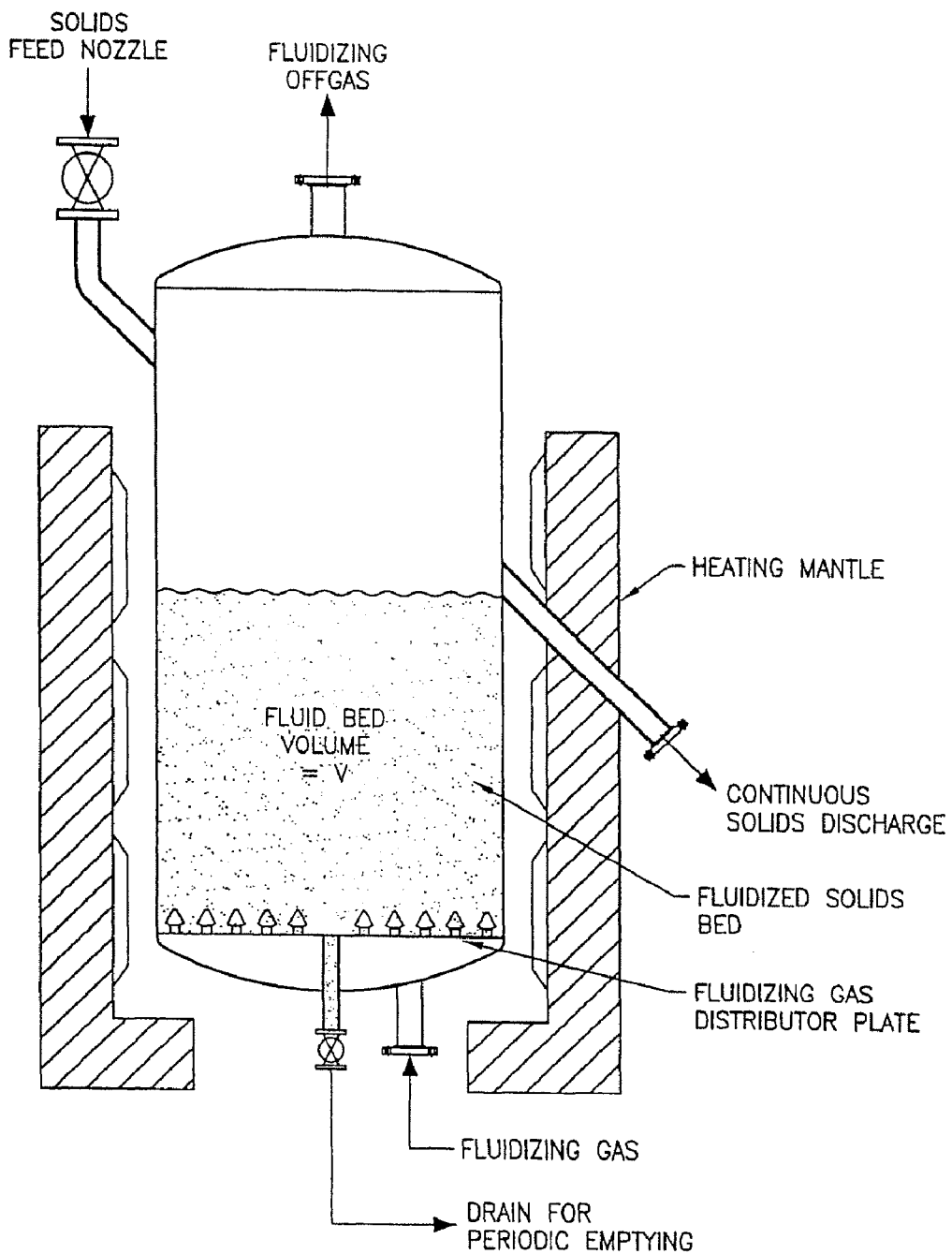
FIG. 1 is a part-sectional schematic view of a known single stage vessel for continuous processing of fluidized solids.

One known method of continuous processing of fluidized particulate solids for thermal conditioning, chemical or other treatments can employ a fluidized bed processing vessel such as is shown in FIG. 1. In this method, particulate solids are continuously supplied into an upper portion of a closed cylindrical processing vessel via a solids feed nozzle and are discharged from the other side of the vessel via a fixed height discharge outlet. The vertical position of the discharge outlet largely determines the height of the solids mass in the processing vessel under steady state conditions. Fluidizing gas is supplied to the bottom of the vessel through a distributor plate bearing gas nozzles, sometimes known as "tuyeres" (not shown), and outputs from the top of the processing vessel. The vertical flow rate of the gas is controlled to cause the particulate solids to fluidize and the resultant fluidized bed of solids generally will behave somewhat like a fluid.

In operating the processing vessel shown in FIG. 1, solids can be fed at a constant volumetric flow rate to the processing vessel through the feed nozzle and allowed to overflow out of the processing vessel at the same constant volumetric flow rate through the discharge outlet. The volume of the fluidized bed of solids in the processing vessel is maintained at a constant level, V.

The fluidized bed of solids can be thermally treated or chemically reacted with the gas stream used to fluidize the solids, or may be subject to both thermal and chemical treatment. The processing vessel can be surrounded by a heating mantle, to elevate the temperature of the fluidized solids to a desired processing temperature for reaction with the flowing gas stream. A typical fluidized solids regimen has good heat transfer characteristics which can provide reasonably uniform temperature distribution between the gas phase and the particulate solids throughout the processing vessel. With efficient construction, the heating or cooling provided by the mantle surrounding the processing vessel can effectively maintain the fluidized solids bed within desired temperature limits for either endothermic or exothermic reactions. This desirable behavior can be attributed to factors such as a high heat transfer coefficient between the processing vessel wall and the moving bed of fluidized solids and the mixing provided by fluidization.

In most fluidized bed processes, the residence time of the solid particles in the system is important and desirably should be predictable and uniform for all solids particles traversing the system. What is sometimes referred to as "plug flow behavior", wherein the fluidized solids move as a plug, can also be desirable. However, in practice, these goals are sometimes difficult to meet.

Referring to the processing method illustrated in FIG. 1, the solid particles are moved through the processing vessel from the feed location to the discharge location by driving forces such as pressure differential, mechanical motivation or leveling of the fluidized medium. In the fluidized bed the solid particles are continuously in motion relative to one another, in a randomized manner. Also, the fluidizing gas creates voids or "bubbles" that impart further motion to the particles. One effect of this constant and randomized motion of the particles is that individual particles take different paths through the processing vessel from the feed point to the discharge point and travel at different velocities according to the particular path a particle may follow. Consequently, different particles experience different residence times in the processing vessel, which can adversely affect processing consistency.

Baffles have been employed to constrain the particles to a relatively uniform path through the processing vessel, with a view to achieving a more uniform particle residence time in the processing vessel, with limited success.

Another known approach to achieving plug flow behavior of fluidized particulate solids is to employ a number of processing vessels, or stages, connected in series in a vertical configuration or a horizontal configuration. A horizontal configuration can be desirable for fluidized gas-solids processes.

Figure 2:
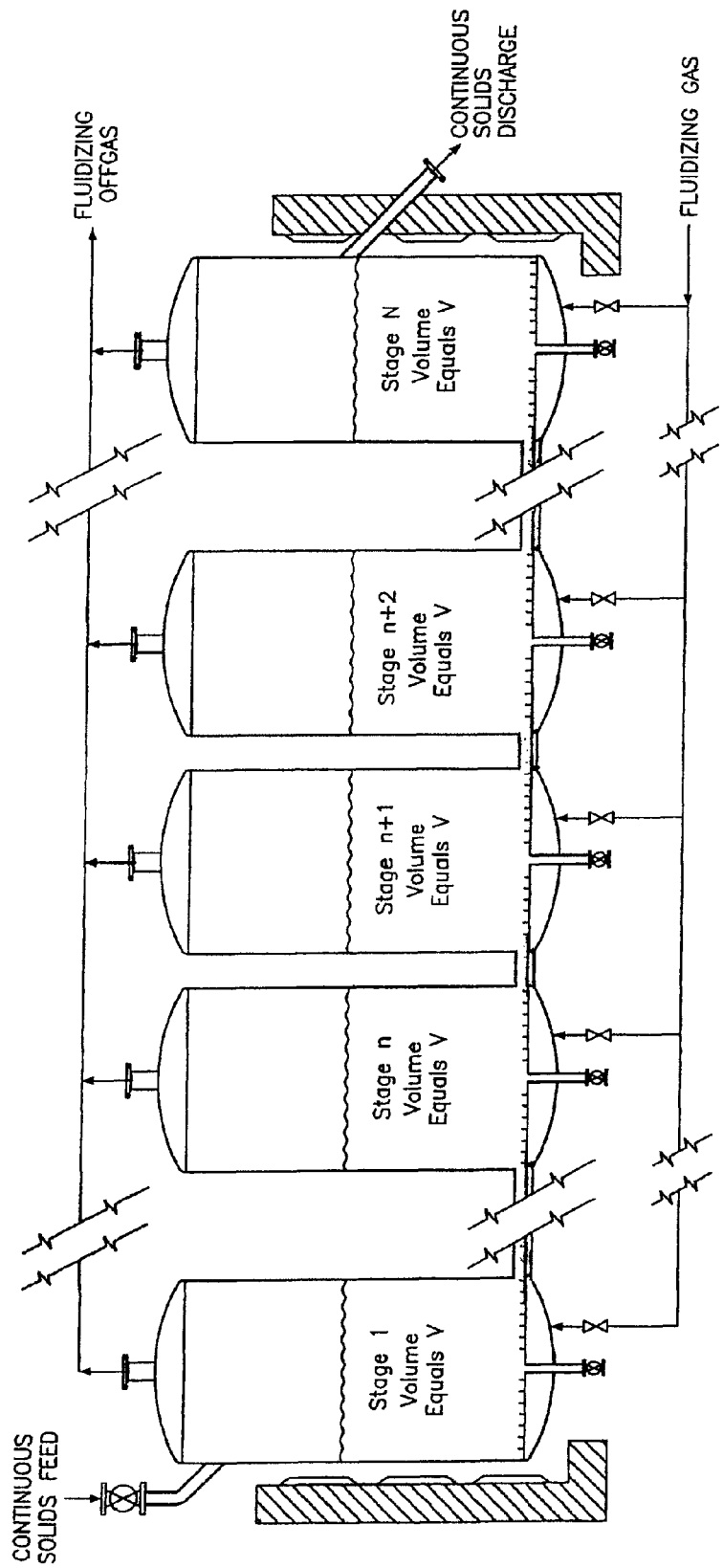
FIG. 2 is a part-sectional schematic view of a known multistage system for continuous processing of fluidized solids.
Figure 3:
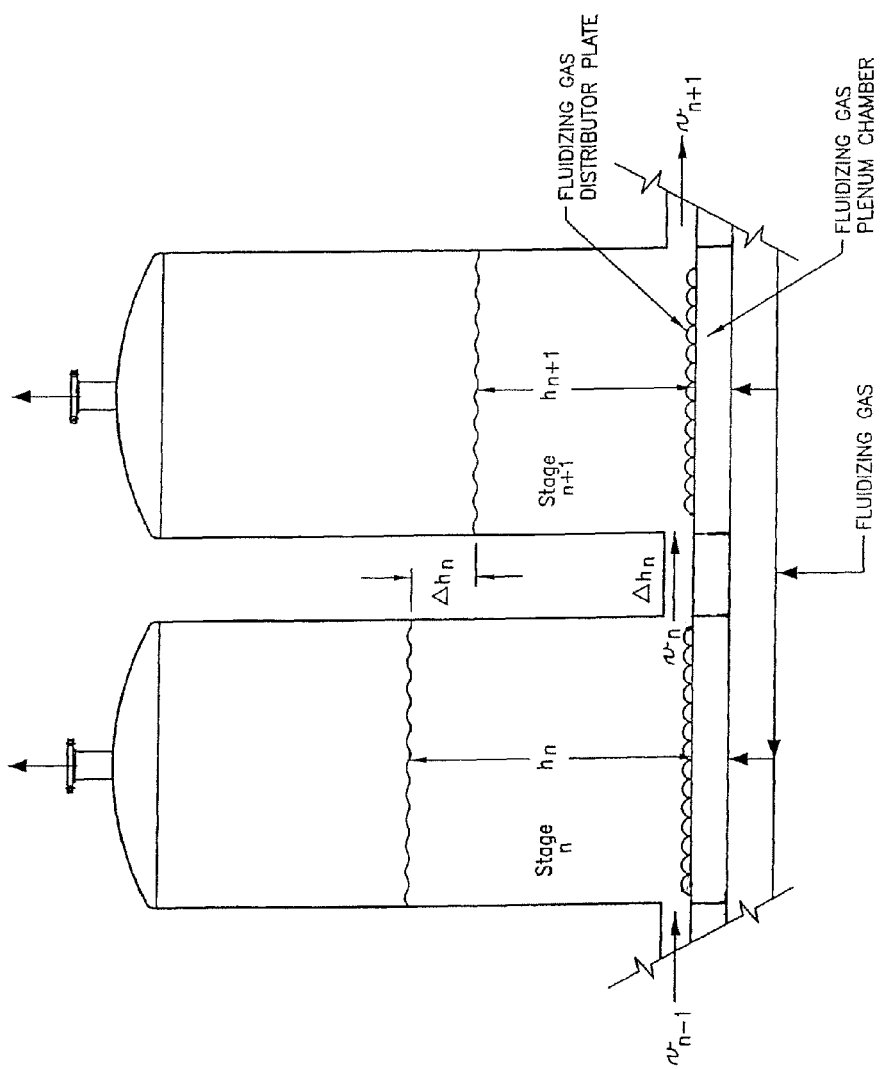
FIG. 3 is an enlarged view of a portion of the multistage system shown in FIG. 2 showing a known mode of transferring fluidized solids between stage vessels.

One known embodiment of horizontal series continuous multistage fluidized bed thermal or chemical processing apparatus is shown schematically in FIGS. 2 and 3.

As shown in FIG. 2, the processing apparatus comprises N stage vessels not all of which are shown. The first stage vessel is labeled "Stage 1", the last stage is labeled "Stage N" and successive intermediate stage vessels are labeled "n", "n+1", and "n+2" respectively. Processing apparatus is known or has been proposed which has up to 12 stage vessels and all the stage vessels have the same volume and can be operated to have the same volume V of fluidized bed solids. Alternatively, the stage vessels can have different volumes, if desired.

In the apparatus shown in FIG. 2, the stage vessels are connected together in series by transfer tunnels, for example pipes, extending between each stage vessel and its neighbor, as is shown in more detail in FIG. 3, both FIGS. 2 and 3 being schematic, as stated. Each transfer tunnel is disposed just above the level of a gas distribution plate which is usually located at the bottom of the stage vessel to supply fluidizing gas to the stage vessel. This location is useful to assist in transferring larger particles present in the fluidized solids which may gravitate to the bottom region of the fluidized bed and could become trapped behind a dividing wall.

In apparatus such as is shown in FIG. 2, the solids product to be processed can be fed continuously to Stage 1 at a desired constant volumetric production rate, designated r. The fluidized solids in Stage 1, having volume, V, are processed for an average residence time, V/r, and flow continuously and when a steady state is attained, flow successively from stage to stage at rate r, to final Stage, N, from which the solids are continuously discharged from the system. The solid particle populations traveling through the system have a residence time which depends upon the shape and size of the individual stages.

For an apparatus having stage vessels of the same shape and size, providing good particle mixing, and having a constant flow rate through the system, including from one stage to the next stage, the residence time distribution of the particles, which can be designated $P(t_r)$, can be determined theoretically or by experiment.

One example of a suitable experimental procedure is to operate the system under steady state conditions with a constant feed rate and then to introduce a quantity of particulate material into the feed stream as tracer particles. The introduced material particles desirably have the same physical characteristics as the particles being processed but also have a monitorable feature that distinguishes them from the other particles being processed. If this quantity of tracer particles is introduced over a known short period of time, $t_i$, relative to the average residence time of particles being processed, $T_r$, a time-related measurement of tracer particles leaving the system, which can be termed an "impulse response function" can be employed to provide an actual residence time distribution function $P(T_r)$ for the total population of particles being fed. For example a small batch of dark colored particles can be mixed in with a white or light colored feedstock of the same material to act as tracers, and the distribution over time of the dark colored particles in the output can be determined as a proportion of the output, by colorimetry.

With respect to theoretical determinations, for the case of ideally mixed stages, termed "ideal stages" operated in series, relevant aspects of the geometry of the system can be described mathematically employing differential equations. The solution, or solutions, to these differential equation can yield predicted residence time distribution functions $P(t_r)$ which are of course limited to the case of ideal stages and may or may not accurately forecast real world system performance.

Figure 4:
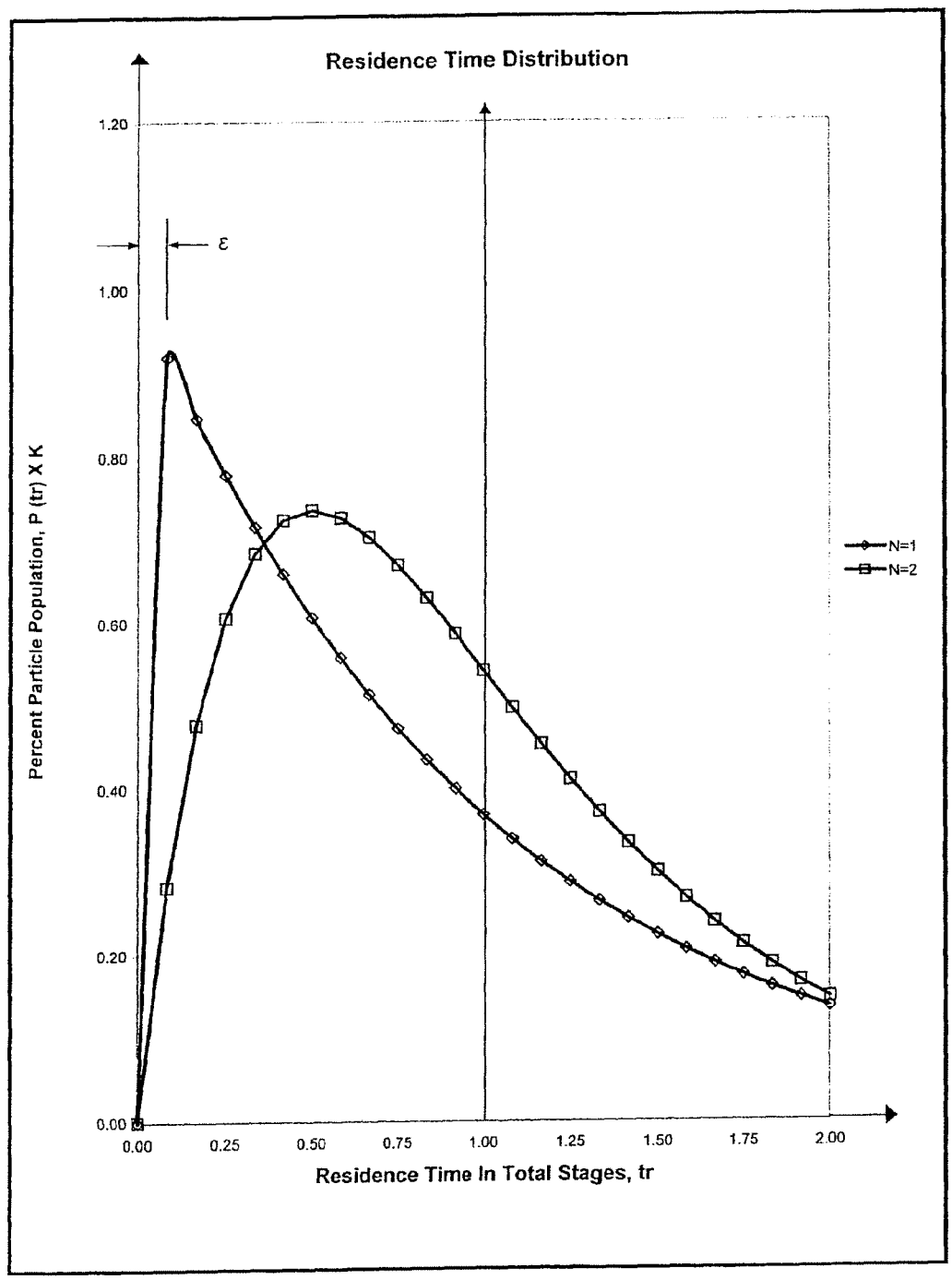
FIG. 4 is a residence time distribution graph for two known fluidized solids processing systems.

Some typical particle residence time distributions are shown graphically in FIG. 4 which plots the percent of the particle population being discharged from the reactor, designated $P(t_r)$, against residence time in the reactor, $t_r$. The constant K normalizes the ordinate for the area under the curves to be unity so that the entire population is 1.0. The nature of the distribution is usually significant when processing a product whose residence time in the system has to meet designated parameters to achieve a desired quality. FIG. 4 shows possible residence time distributions for processing systems having one or two stages i.e. wherein N=1 and N=2. As shown in FIG. 4, the residence time is normalized to the desired residence time $T_r$.

For the case of a single mixed stage, N=1, theoretical considerations suggest that an idealized perfectly mixed stage, can be defined as having an infinite mixing speed so that every particle has the exact same probability of being discharged regardless of where it is located at a given moment in time. However, this condition cannot be realized in practice. Nevertheless, it may be desirable to promote a high degree of mixing in the stage vessel so as to approximate an ideal, perfectly mixed stage.

Referring to FIG. 4 and considering the origin of P ($t_r$), the curve starts at zero because zero particles leave the system in zero time. In the real world, it takes some time for a particle entering a stage vessel to find the discharge point. Accordingly, it requires a finite time, referenced "ε" in FIG. 4, for any particle in the stage vessel to get to the discharge point. The curve for N=2 shows the breadth of the $P(t_r)$ function, which is the degree of spread of the residence time distribution in a two-stage system. Considering FIG. 4, it can be seen that in the single stage vessel modeled, a major percentage of the population of particles exits the system after a residence time of greater or less than the designated residence time, $T_r$. This variation can be attributed to the role of random collisions between the particles causing many particles to take relatively short paths through the system while other particles take longer paths.

In the case of a two stage system, having two processing vessels, when N=2, the statistical chance that the same particle will take the shortest path through the first stage and also the shortest path through the second stage is substantially reduced. By comparing the curves in FIG. 4, it can be seen that in the two processing vessel case where N=2 a more uniform residence time distribution of particles in the processing system can be achieved, with a probability of higher product quality. Substantially more of the particles have a residence time $t_r$ close to the desired residence time 1.00 and the peak percentile moves significantly from a residence time of about 0.1 of the desired value to about half the desired value. However, the distribution curve is still unduly broad indicating that many particles may have undesirable residence times.

Accordingly, the invention can provide a novel multistage processing system having a multiplicity of stage vessels and which nevertheless can yield a desirable distribution curve for the residence times of the particulate solids processed by the system. For example, only small proportions of particles may have undesirably short or undesirably long residence times in the system.

There are known examples of horizontal multistage fluidized bed processing systems having as many as eight stages, but employment of a significantly greater number of stages apparently has not been proposed for a variety of reasons, including questions as to economic feasibility.

For example, it is desirable to avoid forward or back mixing between adjacent stages, but at each transfer point from one stage to the next successive stage the fluidized solids must pass through an opening or passageway in the wall separating the stages which may provide opportunities for between-stage mixing. Transfer tunnels having a significant length between stage vessels can be useful in reducing possible forward mixing or back mixing between stages which can reduce efficiency. However, undue transfer tunnel length between stages path may be disadvantageous. The need to control back mixing and forward mixing generally means that it is not practicable to separate the stages with simple baffles.

Also, it is usually desirable that the flow area of the passage between stages be small to help control forward and back mixing but small flow passages can lead to obstructions, resulting in a broadening of the residence time distribution function, P(Tr).

Furthermore, for a multistage series processing system each passageway between stages must usually remain unobstructed to avoid shutting down or slowing the process. If a passageway does become obstructed, it would be desirable to have convenient access to the tunnel or other passageway to clear the obstruction.

Referring to FIG. 3, it can be seen that the driving force that moves the fluidized solids through the system is the level increment, designated $\Delta H_n$ in FIG. 3, of the fluidized solids between any stage, n, and a subsequent stage, n+1. Since fluidized solids behave hydraulically like a liquid phase, in certain respects, this differential level, shown as $\Delta h_n$ between the phases drives the flow of fluidized solids from stage, n, to stage, n+1, through the connecting transfer tunnel. In a multistage system it is important that the pressure drop through each transfer tunnel, or other connector between stages, be low, because in a series of stages the pressure drops are additive.

For example an embodiment of multistage fluidized bed processing system according to the invention can comprise sixty stages arranged in series with fifty nine transfer tunnels connecting the stages together. Desirably, each stage should require the same pressure drop, $\Delta h_m$, to handle a specified process flow rate. In this case if, for example, $\Delta h_m$ is 0.25 inches of fluidized product, the pressure difference between the first stage fluid bed level, N=1, and the last stage fluid bed level, N=60 is 59×0.25 inches or 14.75 inches.

In some cases, a difference in fluidized bed levels of this magnitude may be unacceptable from a processing standpoint. Accordingly, in another embodiment of the invention the multistage system is inclined downwardly in the direction of flow of product through the system to provide a gradient yielding a gravitational reduction in the pressure difference required to maintain flow. However inclining the system may also be undesirable from an engineering or a processing standpoint in some cases.

Accordingly the invention also provides embodiments of multistage fluidized bed processing system employing one or more transfer tunnels between stages which can operate effectively and reliably with relatively low pressure drops through the transfer tunnels. Some embodiments of the invention can operate with values for $\Delta H_m$ of one-sixteenth of an inch, i.e. 0.0625 inches, or less.

The requirement for effective stage separation to control intermixing between stages is often incompatible with low-pressure drop tunnel design. Accordingly, the invention provides, in some embodiments a low-pressure drop transfer tunnel which can nevertheless effectively limit intermixing between stages.

A further difficulty to be overcome in providing a multi-stage fluidized bed continuous processing system is that in many multistage processing applications, it is desirable to control the temperature of the several fluidized beds of solids. All the beds may be desired to have the same temperature or a specific temperature profile from stage to stage may be needed to meet the requirements of a particular process being performed in the system. Such temperature requirements have typically been met by providing heating or cooling around the vessel walls forming the various process stages. However, known heating or cooling means, such as tube bundles or heating mantles around the vessels, may become unduly complex, cumbersome and costly for a multistage system having a relatively large number of stages.

Accordingly, to solve or mitigate one or more of these problems, the invention provides a continuous multistage fluidized bed processing system and method for gas solids contacting in commercial applications such as the system embodiment illustrated in FIGS. 5-12 of the drawings. The system can comprise a large number of stages, such as six or more up to hundreds and can provide good uniformity of residence time on a particle-to-particle basis.

Figure 5:
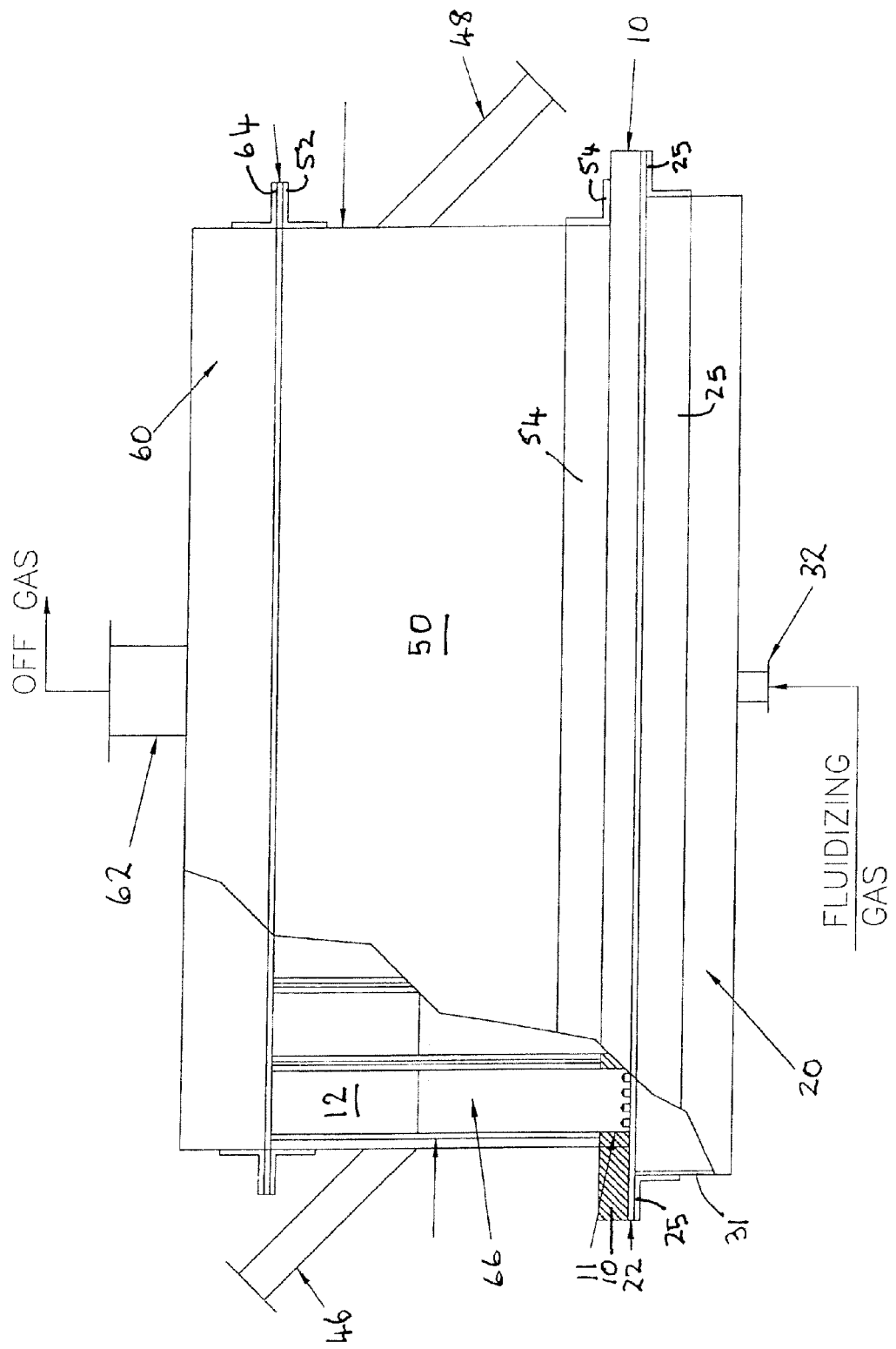
FIG. 5 is a front elevation, partly in section, of one embodiment of multistage system for continuous processing of fluidized solids according to the invention.
Figure 8:
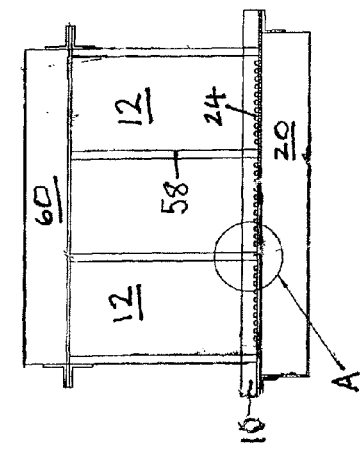
FIG. 8 is a partial righthand end view of the vessel multistage system shown in FIG. 6, with a containing wall removed.
Figure 7:
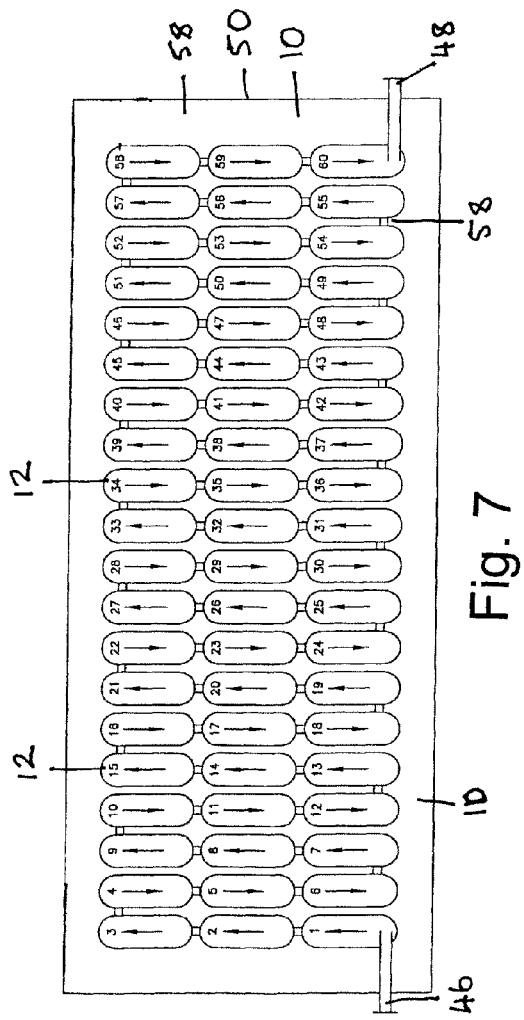
FIG. 7 is a top plan view of the multistage system shown in FIG. 6.

The particular system embodiment shown in FIG. 5 is a sixty stage continuous processing system wherein the sixty stages are arranged in series from a feed input point to a discharge point as shown in FIG. 7.

Referring to FIGS. 5-10, the illustrated embodiment of multistage system has a base plate 10, which comprises a lower section 11 of the containing wall of each of a multiplicity of stage vessels 12 as well as a top wall 42 and side walls 40 for each of a number of transfer tunnels 18. Transfer tunnels 18 extend between adjacent stages 12 and form passageways connecting successive stage vessels 12 for transfer of solids from one stage vessel 12 to another. Transfer tunnels 18 are sufficient in number to connect stage vessels 12 together in a desired pattern. For a single series of stage vessels 12, the number of transfer tunnels 18 can for example be one less than the number of stage vessels 12.

Base plate 10 can comprise a generally flat plate from which stage vessels 12 and transfer tunnels 18 project upwardly. Base plate 10 can be fabricated as an integral unitary piece from a thick metal plate or casting of metal or refractory material or can have another suitably substantial construction, and can, if desired, comprise a structural backbone of the system, providing support for other system elements. One embodiment of base plate 10 can be manufactured as a complex comprising lower sections 11 of stage vessels 12 and transfer tunnels 18 using suitable cutting equipment, for example, water jet cutting equipment to cut suitable openings, channels or other shapes from a monolithic plate or slab of suitable material.

In some embodiments, base plate 10 can have a thickness in the range of from about 25 mm to about 250 mm (approximately one to ten inches thick). If desired base plate 10 can be thicker than these dimensions or can be formed in sections or components or multiple pieces which are secured together to form a structural unit and optionally can be detached from one another, if desired. Some components of base plate 10 can be permanently secured together by welding, riveting or other suitable means, if desired. Base plate 10 can have any combination of compatible ones of these features.

As shown for example in FIG. 5, base plate 10 can be flange-mounted above a plenum chamber 20 which provides pressurized fluidizing gas to stage vessels 12. Sandwiched between plenum chamber 20 and base plate 10 is a fluidizing gas distributor plate 22 which distributes fluidizing gas to stage vessels 12 and transfer tunnels 18.

Gas distributor plate 22 extends beneath stage vessels 12 and transfer tunnels 18 and supports a multiplicity of gas inlets, which in the system embodiment shown can be gas injection nozzles 24, or tuyeres. Fluidization gas is provided to stage vessels 12 and transfer tunnels 18 through gas nozzles 24 which communicate through gas distributor plate 22 with a pressurized gas-containing plenum or chamber 20. Gas distributor plate 22 can be constructed as a common integral unitary member serving all stage vessels 12, and optionally can be monolithic, if desired. Alternatively, gas distributor plate can be formed of a number of separate or separable components, which optionally may be assembled into an integral unitary member for use. Gas distributor plate 22 can be formed from a continuous sheet of steel, aluminum alloy or other suitable material, or can be formed from two or more sheets joined together.

In one useful embodiment of the invention, gas distributor plate 22 is removably attachable to base plate 10. For example, plenum housing 31 can carry peripheral flanges 25 which bolt through gas distributor plate 22 to attach plenum housing and gas distributor plate 22 to base plate 10, sandwiching gas distributor plate 22 between plenum housing 31 and base plate 10. Gas distributor plate 22 can then be separated from base plate 10, by opening the bolted flanges and lowering gas distributor plate 22 and plenum chamber 20 to provide good access to transfer tunnels 18.

Alternatively, other suitable means, for example hinges or pivots, can be provided, so that gas distributor plate 22 can readily be opened, or removed, to provide access to the interior of the system for cleaning and maintenance and the like. In a further alternative construction, gas distributor plate 22 and plenum chamber 20 are slidable as a unit, or separately, relatively to base plate 10, in a horizontal direction, for example on tracks attached to base plate 10. Gas distributor plate 22 and plenum chamber 20 can be slidable in one direction to provide access to some transfer tunnels 18 and stage vessels 12 and slidable in the opposite direction to provide access to the other transfer tunnels 18 and stage vessels 12.

The ability to remove or open gas distributor plate 22 and plenum chamber 20 provides convenient access to transfer tunnels 18 and the interiors of stage vessels 12 to clear obstructions, for routine cleaning and maintenance and for other purposes.

Desirably, gas nozzles 24 are arranged in a pattern which matches the pattern of lower sections 11 of the multiplicity of stage vessels and the interiors of transfer tunnels 18 and which serves to feed the fluidizing gas into stage vessels 12 and transfer tunnel 18.

The pattern of gas nozzles 24 and any other variable characteristics relating to gas nozzles 24 can be selected to maintain the fluidized solids in a fluidized state, desirably with good uniformity of fluidization, as fluidized solids pass through the multistage system from one vessel stage 12 to another vessel stage 12 and through transfer tunnels 18. Desirably also, the pattern of gas nozzles 24 in gas distributor plate 22 is such that none are present outside the areas of stage vessels 12 and transfer tunnels 18. In one embodiment of the invention, no gas nozzles 24 are present in the areas between individual stage vessels 12 or in the vicinity of their surrounding walls (to be described).

Figure 9:
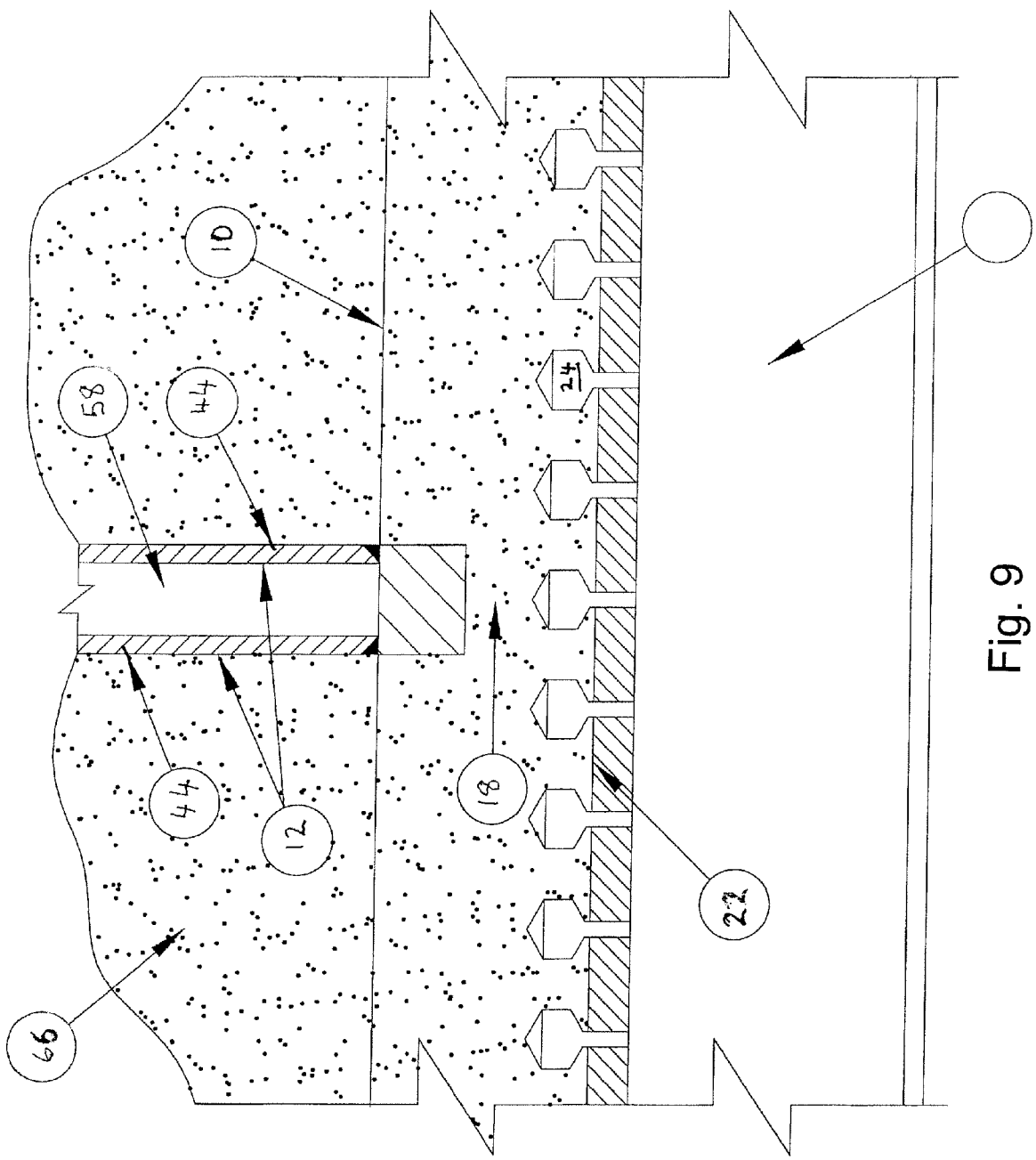
FIG. 9 is an enlarged view of the portion of FIG. 6 that is referenced "A" in the figure, showing a transfer tunnel between stage vessels, which showing is similar for an enlarged view of the portion of FIG. 8 that is similarly labeled.
Figure 11:
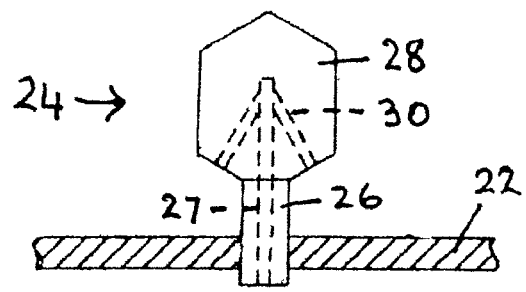
FIG. 11 is an enlarged elevation of a fluidized gas inlet nozzle, also known as a tuyere, useful in the multistage system shown in FIG. 6.

Referring now to FIGS. 9 and 11, each gas nozzle 24 here shown comprises a tuyere having a neck 26 and a durable, optionally solid, head 28. Neck 26 is traversed by a vertical feeder passage 27 and head 28 is traversed by one or more downwardly inclined radial distributor passages 30 communicating with feeder passage 27. Gas passages 30 connect with hollow neck 26 and open out on the underside of gas nozzle head 28. Optionally, gas passages 30 can be from two to six in number and can be evenly distributed around gas nozzle head 28. Each gas nozzle 24 extends through distributor plate 22 and opens into plenum chamber 20 to receive fluidizing gas from plenum chamber 20. Gas nozzle 24 discharges the received gas onto the floor of the respective stage vessel 12 or transfer tunnel 18 in which it is located, optionally in a number of directions according to the number and disposition of gas passages 30. Heads 28 of gas nozzles 24 desirably are of sturdy and durable construction as to sustain constant abrasion by the moving fluidized solids particles, without unacceptable damage or wear.

Other fluidized gas inlets can be employed in place of gas nozzles 24, if desired, as is known to or becomes known to a person of ordinary skill in the art. For example, the fluidized gas inlets can comprise simple openings or perforations in a gas distributor plate 22. Desirably, some means can be provided to block or obstruct the openings, or perforations, to prevent solids falling through them if there is no gas flow, for example a bolt could be loosely fitted into each hole or perforation.

Figure 12:
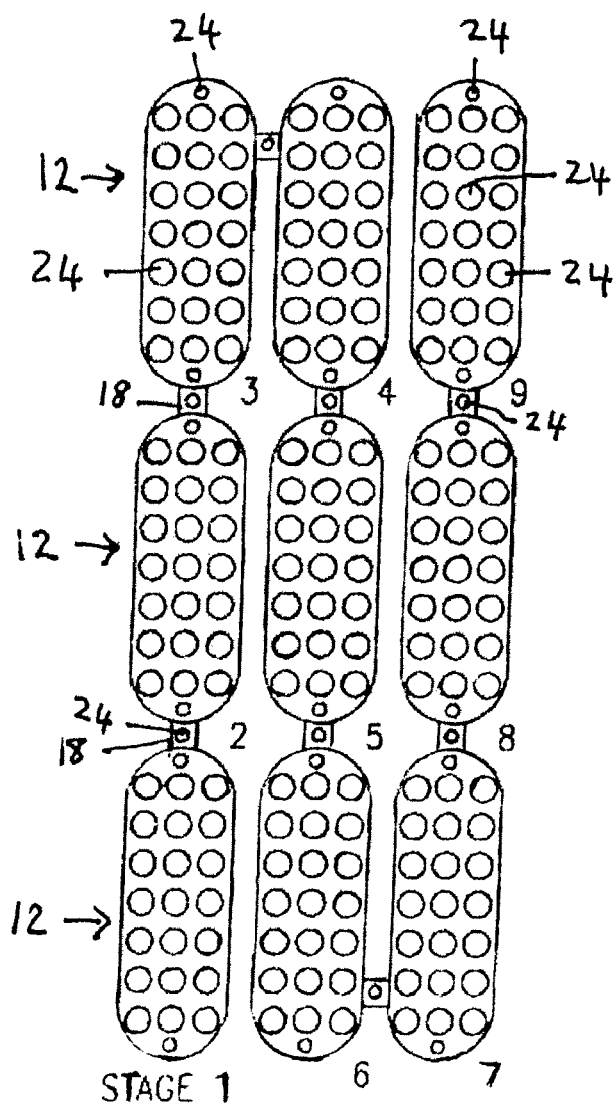
FIG. 12 is an enlarged plan view of a portion of a gas distributor plate useful in the multistage system shown in FIG. 6.

In one embodiment of the invention, gas nozzles 24 are spaced on an orthogonal grid relatively closely to each other, for example with a space between the heads 28 of adjacent gas nozzles that is no greater than about the width of a head 28. One possible arrangement of gas nozzles 24 is shown in FIG. 12. In FIG. 12 it can be see that each stage vessel 12 has a rectangular grid of 3×7 gas nozzles 24, that an additional smaller gas nozzle 24 is provided at each end of the grid in the curved portion of the stage vessel section and a further small gas nozzle 24 is provided in each transfer tunnel 18. Each transfer tunnel 12, or some transfer tunnels 12, can be provided with two or more gas nozzles 24 or other fluidizing gas inlets, if desired, supported by that portion of gas distributor plate 22 which provides the floor of the respective transfer tunnel 18.

As stated, gas distributor plate 22 can provide a bottom wall or floor for stage vessels 12 and also for transfer tunnels 18, with gas nozzles 24 project upwardly into the respective stage vessels 12 and transfer tunnels 18. It can be understood that in the illustrated embodiment of system according to the invention, gas distributor plate 22 extends beyond any individual stage vessel 12, across the vessel walls, beneath the space between neighboring stage vessels 12, beneath any transfer tunnels connecting with the individual stage vessel and beneath one or more neighboring stage vessels. However, other constructions of gas distributor plate 22 can be employed, if desired.

Plenum chamber 20 comprises a pressurized gas chamber enclosed by a plenum housing 31 and supplied with gas from a gas supply pipe 32. Plenum chamber 20 extends beneath substantially the whole area of distributor plate 22 to be freely accessible to feeder passage 27 of each gas nozzle 24. If desired, a priming zone 34 can be divided off plenum chamber 20 by a dividing wall 36, to maintain gas pressure in the first vessel stages of the system during startup before downstream stage vessels 12 fill with solids. Optionally, priming zone 34 can have its own gas supply pipe 38. In some embodiments of the invention (not shown), plenum chamber 20 is sectionalized, each section serving a number of gas nozzles 24 supplying one or more stage vessels 12 or transfer tunnels 18.

In one embodiment of the invention, plenum chamber 20 has sufficient capacity to buffer fluctuations in gas supply and demand and provide a constant pressure gas source for gas nozzles 24.

Figure 10:
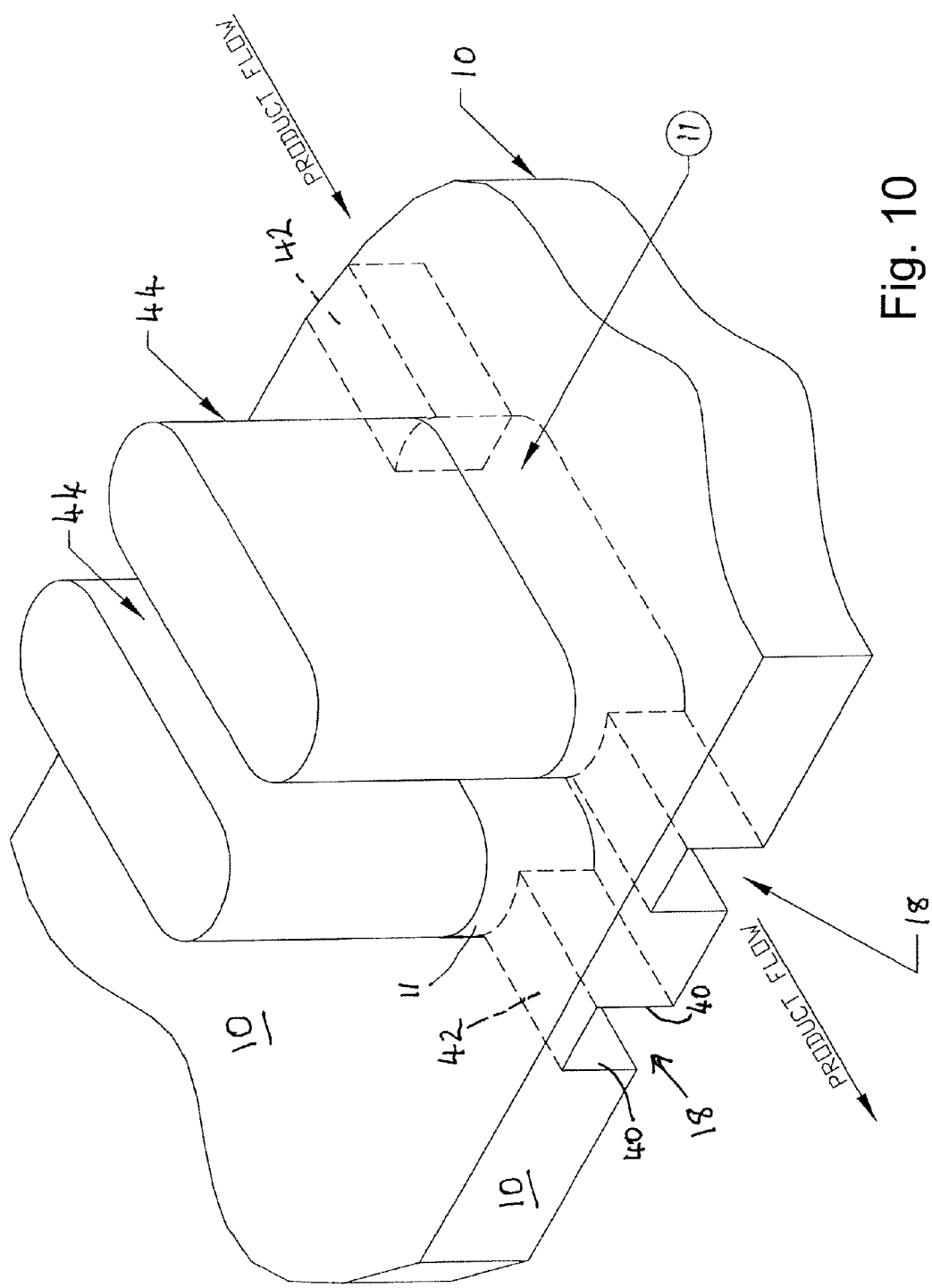
FIG. 10 is a schematic perspective view of a portion of the multistage system of FIG. 6 showing a possible configuration of two stage vessels and their associated transfer tunnels.

As best seen in FIG. 10, base plate 10 is cut away to form lower sections 11 of each stage vessel 12 and the sides 40 and roof 42 of each transfer tunnel 18. As shown, each stage vessel lower section 11 is defined by a vertical oval-shaped opening which extends through base plate 10 from one side to the other. Transfer tunnel sides 40 and roof 42 are defined by a rectangular-sectioned channel in lower section 11 which opens downwardly. Various shapes of stage vessels 12 and transfer tunnels 18 are possible, as will be apparent to a person of ordinary skill in the art. As stated, or implied, stage vessel lower sections 11 and transfer tunnels 18 are closed by gas distributor plate 22. Gas nozzles 24 supported by gas distributor plate 22 are accommodated in the respective cutaway portions of base plate 10.

Transfer tunnels 18 are desirably little, if any, longer than is necessary for effective control of back mixing and forward mixing, and desirably also are sufficiently long to fully accommodate at least one gas nozzle 24. Transfer tunnels 18 can have any suitable height. Desirably each transfer tunnel 18 has a sufficient height for the particulate solids being processed to flow over the gas nozzle or nozzles 24 located in a respective transfer tunnel 18. It can also be useful for the height and/or other dimensions, of one or more of transfer tunnels 18, or of all transfer tunnels 18, to be such that fluidizing gas admitted through the gas nozzle or inlets 24 located in the respective transfer tunnel 18 impacts the roof 42 of the transfer tunnel and is deflected laterally to facilitate flow of solids through the transfer tunnel 18. In a given embodiment of multistage system, all the transfer tunnels 18 can have similar dimensions, if desired.

Alternatively, the dimensions of transfer tunnels 12 can be varied within a given multistage system embodiment. In one such embodiment of multistage system, useful for a process wherein fluidized solids become significantly more dense as they advance through the system, for example as the result of loss of volatiles or contraction, or both, some downstream transfer tunnels 12 are fabricated with smaller cross-sectional areas to maintain a constant flow velocity of the fluidized solids through the multistage system. Removable tunnel inserts or the like can be inserted in selected transfer tunnels 12, to reduce the tunnel cross-sections for some processes, and can be removed for others, if desired.

Each stage vessel 12 further comprises a tubular upper section 44 which mates with and, if desired, can be welded at its base, or otherwise affixed, to a respective lower section 11 of base plate 10, to complete the multistage array of stage vessels 12. Upper sections 44 and lower sections 11 together define the size and shape of each stage vessel shown. As shown, stage vessels 12 all have the same size and shape. However stage vessels 12 could have different sizes or different shapes or both different sizes and different shapes, if desired. Referring to FIG. 10, each stage vessel 12 has a uniform cross-section throughout its height taking the form of an elongated oval with smoothly rounded ends. This elongated shape with ends that are internally smoothly contoured in the direction of fluidized solids flow is believed helpful to efficient operation of the multistage system.

In general, it is desirable for internal surfaces of the multistage system that are exposed to moving particulate solids to have smooth contours that will not impede the flow of the particulate solids. Also, it is generally desirable to employ durable materials that will not be unduly eroded, or abraded, by the moving particulate solids and which, if appropriate, can withstand elevated processing temperatures. Stainless steel can be employed for some embodiments of the invention, and aluminum or other alloys can also be useful.

As shown in FIG. 7, the exemplary embodiment of multistage system illustrated in the drawings comprises an array of three parallel horizontal rows of stage vessels 12, each row containing twenty stage vessels. The sixty stage vessels 12 are connected together by transfer tunnels 18 to provide a sinuous path for fluidized solids to flow through each stage vessel 12 in series from a solids feed port 46 to a solids discharge port 48. In FIG. 7, for convenient reference, stage vessels 12 are sequentially numbered from 1 to 60 according to the sequence of flow in which they are connected.

As also is shown in FIG. 7, transfer tunnels 18 can be connected in end alignment or laterally with stage vessels 12. In configurations other than that shown in FIG. 7, a transfer tunnel 18 can be connected in endwise alignment with one stage vessel 12 and laterally to the next stage vessel 12. Other arrangements and numbers of stage vessels will be or become apparent to a person of ordinary skill in the art in light of this example and this disclosure. For example, with a different interconnection of stage vessels 12 by transfer tunnels 18, the flow path could have a Y configuration with two smaller flow paths merging into a single larger flow path.

Extending around the array of stage vessels 12 is an outer containing wall 50 which encloses and houses upper sections 44 of stage vessels 12. To facilitate attachment to the multistage system, containing wall 50 can bear flanges 52 and 54 around its top and bottom peripheries respectively, or can be provided with other suitable attachment means. Bottom flange 54 can be connected to base plate 10 by bolts or the like.

The height of containment wall 50 usefully can be chosen to be equal to the height of upper sections 44 of stage vessels 12 so that a seal plate 56 located on top of containing wall 50 can seal against stage vessels 12 as well as containment wall 50, employing one or more gaskets, if desired. Seal plate 56 defines with containing wall 50, upper sections 44 of stage vessels 12 and base plate 10, a temperature control fluid enclosure 58 common to all or a desired number of stage vessels 12. Temperature control fluid enclosure 58 can be employed to circulate heating or cooling gas or liquid around stage vessels 12, to control the temperature of stage vessels 12. Temperature control fluid, for example air, can be admitted to and discharged from temperature control fluid enclosure 58 via inlets and outlets (not shown), the outlets being positioned "low-high" for heating gas inlet-outlet and/or "high-low" for cooling gas inlet-outlet. Temperature control fluid enclosure 58 can be divided into multiple sub-regions controllable to have different temperatures, one sub-region from another sub-region, if desired.

The multistage continuous processing fluidized bed system shown comprises a freeboard chamber 60 mounted on top of heating chamber seal plate 56 by means of a peripheral flange 64 which can be bolted or otherwise secured to top flange 52 of containment vessel 50. Other means of securing freeboard chamber 60 to the system can be employed, if desired. Freeboard chamber 60 provides a top closure can collect the off gas generated by each stage vessel 12 and discharge it through one or more gas discharge ports 62.

One embodiment of the invention comprises a continuous multistage fluidized bed processing system having as many stages as are necessary to achieve a desired degree of uniformity of residence time of the particles being processed.

In one method of operating the illustrated multistage system for processing fluidized solids, prior to feeding solids into the system, pressurized air is supplied to plenum chamber 20 and priming zone 34 to establish a fluidizing air flow through gas nozzles 24. Also, if a particular processing temperature or temperature profile is to be maintained, heating or cooling gas is admitted to temperature control gas enclosure 58, and time is allowed for temperature conditioning of the system, if necessary. A particulate solids feedstock, for example aluminum oxide grit powder, is then fed into the system through solids feed port 46 and into the first stage vessel 12, at a predetermined constant volumetric rate related to the characteristics of the system and of the feedstock.

The particulate solids drops towards the floor of the first stage vessel 12 where it encounters upward air flow from gas nozzles 24 in the portion of gas distributor plate 22 constituting the floor of the stage vessel. This upward air flow fluidizes the descending particulate solids. As more particulate solids flow into the first stage vessel 12, the downward pressure applied by the upwardly building bed of fluidized solids moves the solids into the first transfer tunnel 12. In the first transfer tunnel 18, the fluid solids encounter air flow from the gas nozzle or nozzles 24 in transfer tunnel 18 which maintains fluidization and prevents plugging of the tunnel. The hydrostatic-like pressure of the bed of fluidized solids in the first stage vessel 12 moves the fluidized solids into the first transfer tunnel 18 directing the air flow from the gas nozzle or nozzles 24 in the transfer tunnel 18 toward the next stage vessel 12, thereby facilitating movement of the fluidized particulate solids through transfer tunnel 18 into the next stage vessel 12. The gas nozzle or nozzles 24 in the transfer tunnel 18 also maintain fluidization of the particulate solids during their transit through transfer tunnel 18.

Particulate solids entering the second stage vessel 12 promptly encounter the upward flow of fluidizing air emerging from gas nozzles 24 in the second stage vessel 12 which maintains fluidization of the particulate solids emerging into the second stage vessel 12. Continued flow of particulate solids through the first transfer tunnel 18 builds up a bed of fluidized solids in the second stage vessel 12 providing a hydrostatic-like pressure head to move the flow of particulate solids into and through the second transfer tunnel 18 into the third stage vessel 12. The process repeats through all the stage vessels 12 in the multistage system until the last stage vessel 12 is reached and the flow of particulate solids reaches the last stage vessel 12 and emerges from solids discharge port 48.

Figure 6:
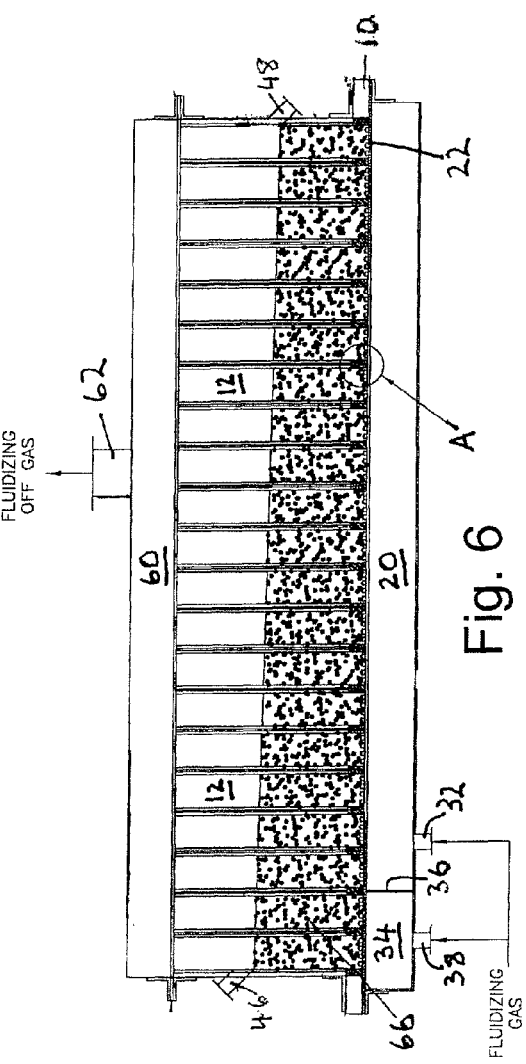
FIG. 6 is a section of another embodiment of multistage system for continuous processing of fluidized solids according to the invention which has many similarities to the embodiment shown in FIG. 5, and is drawn to a different scale.

After startup, a steady state such as is shown in FIG. 6 can be reached where the height of the bed of fluidized solids 66 in each stage vessel 12 shows a diminishing progression along the sequence of stage vessels 12 traversed by the flow of particulate solids. The differential in height between one stage vessel 12 and the next is indicative of the pressure required to move the particulate solids flow through the connecting transfer tunnel 18.

In the ordinary course of events, the fluidizing action of gas nozzle or nozzles 24 in each transfer tunnel 18 is effective to prevent obstructions in the tunnels which could disrupt orderly flow of the particulate solids through the system. In the event that a tunnel obstruction should nevertheless occur, the process can be stopped, and the obstruction can be cleared by unbolting flanges 25 and lowering plenum housing 31 and gas distributor plate 22 away from base plate 10, providing good access to transfer tunnels 18 to clear the obstruction or obstructions. Access is at the same time provided to the interiors of stage vessels 12, should that be needed for routine or emergency maintenance or other purposes.

Efficient tunnel design can be helpful in making systems with large numbers of stage vessels feasible. For example with a sixty-stage system, there are fifty-nine tunnels that must work reliably. Any single tunnel malfunctioning can shut down the processing line, which may be very costly to a high volume processing facility.

The following nonlimiting example describes one embodiment of particulate solids processing method which can be practiced on a multistage system such as is illustrated in FIGS. 5-12 of the drawings.

Example

Drying Aluminum Oxide

Processing specifications for a process of drying aluminum oxide to reduce volatiles, for example water, require that particles of a white aluminum oxide product having an average particle size of 120 micron be heated to a temperature of 250° C. and be held at that temperature for one hour. More specifically, quality control specifications require that the aluminum oxide be heated a temperature of 250° C. for at least 40 minutes, and for not more than 80 minutes.

This process is carried out on a 60 stage system wherein each stage vessel 12 has a cross-sectional size of about 102 mm by about 305 mm (about 4 inches by 12 inches) and a height of about 1143 mm (about 45 inches). The fifty-nine transfer tunnels 18 that connect the stage vessels together each have a rectangular cross-sectional shape of about 38 mm (about 1.5 inches) wide and about 44 mm (about 1.75 inches) high and have a length of about 25 mm (about 1.0 inch). Each transfer tunnel 18 contains two fluidized gas nozzles 24 to provide good fluidization in the tunnels and yield a low pressure drop at designed production flow rates.

Prior to feeding product into the multistage system, heated air is admitted into temperature control gas enclosure 58 and the system is allowed to establish a temperature of 250° C. throughout the stage vessels 12. The white particulate aluminum oxide product is then fed into the first stage of the 60-stage system at a volumetric flow rate controlled to be 3780 lbs/hr.

At steady state, the system has a fluidized bed level of about 744 mm (about 29.3 inches) at the feed point in stage vessel number 1 one and a level of about 521 mm (about 20.5 inches) at the discharge point in stage vessel number 60. There is a progressive decline in the height of the fluidized bed from one stage vessel 12 to the next, as is shown in FIG. 7. The difference in bed height between the first and the last stage vessels, namely about 224 mm (about 8.8 inches) of fluidized solids, can be understood as indicating the total pressure drop occurring across the 59 transfer tunnels 18 which connect the sixty stage vessels 12. Dividing the pressure drop by the number of transfer tunnels yields a figure of about 3.8 mm (about 0.15) inches of fluidized bed equivalent pressure drop per transfer tunnel. This is a surprisingly low figure attributable to features of the invention, for example the injection of fluidized gas into the transfer tunnels 18 and, possibly, also to the cross-sectional shape of the stage vessels 12. Without transfer tunnel gas inlets 24, transfer tunnels 18 having a smooth floor throughout their length in place of transfer tunnel gas inlets 24, the pressure drop is contemplated as being substantially higher.

The described dimensions provide a freeboard height between the top of the fluidized bed level and the top of the stage vessel 12 of about 406 mm (about 16 inches) in stage vessel number 1 increasing to about 622 mm (24.5 inches) in stage vessel number 60.

The average fluidized bed volume in each stage is about 1,980 cubic centimeters (about 0.70 cubic feet).

The average residence time of the total aluminum oxide particle population flowing through the unit is one hour. The bulk density of the fluidized aluminum oxide at an air fluidization rate of about 3.35 meters (about 11.0 feet) per minute in the multistage system described is about 1442 kilograms per cubic meter (about 90 lbs per cubic foot).

To determine the residence time distribution of the aluminum oxide particles processed, with the unit operating at a constant feed rate of 3780 lbs per hour and at steady state conditions, a batch of 35 lbs of particles of brown aluminum oxide of the same size shape and weight as the white particles is rapidly fed into stage vessel number 1 while the feed of white aluminum oxide continues and the constant feed rate of 3780 lbs per hour is maintained for the mixture. The fraction of brown particles output in the discharge stream, which can be determined calorimetrically, gives the residence time distribution of the population of particles fed to the unit under the processing conditions employed.

Figure 13:
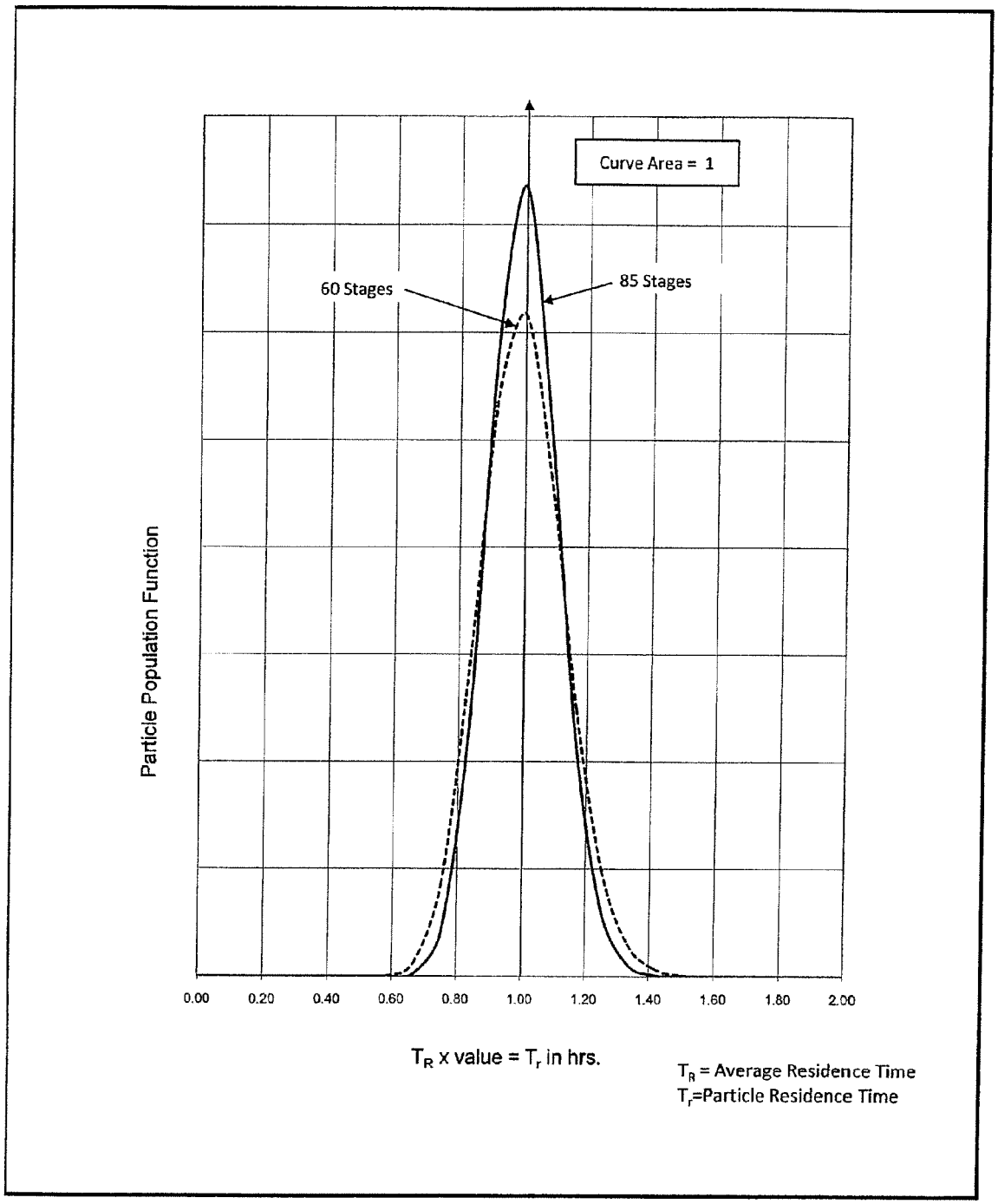
FIG. 13 is a graph showing possible residence time distributions for two multistage fluidized solids processing systems according to the invention having 60 stages and 85 stages respectively.

Some results obtainable by this method are shown in FIG. 13 where, as in FIG. 4, the actual residence time is plotted on the abscissa as a proportion of the average residence time and the ordinate is normalized for the area under the curves to be unity so that the residence time of the entire population is 1.0. Thus, the abscissa of the graph shown in FIG. 13 is the fraction of the one hour average residence time experienced by the particle population. The ordinate of this graph is a scale factor giving the area under the curve equal to unity, i.e. the entire population. The area under the curve between two values of residence time is the fraction of the total population having a residence time between the two values.

The two graphs shown in FIG. 13 represent the output from a mathematical model idealized for a 60 stage system and an 85 stage system, respectively. Surprisingly, analysis of the fraction of brown particles output in the test described above, can yield data points which all lie between these two graphs, suggesting that the actual 60 stage unit has an efficiency slightly higher than would be expected from theoretical considerations. While the invention is not limited by any particular theory, this useful finding may be attributable to the particular oval geometric shape of the individual stage vessels 12 and to the use of gas nozzles 24 to inject fluidizing gas into transfer tunnels 18.

Figure 14:
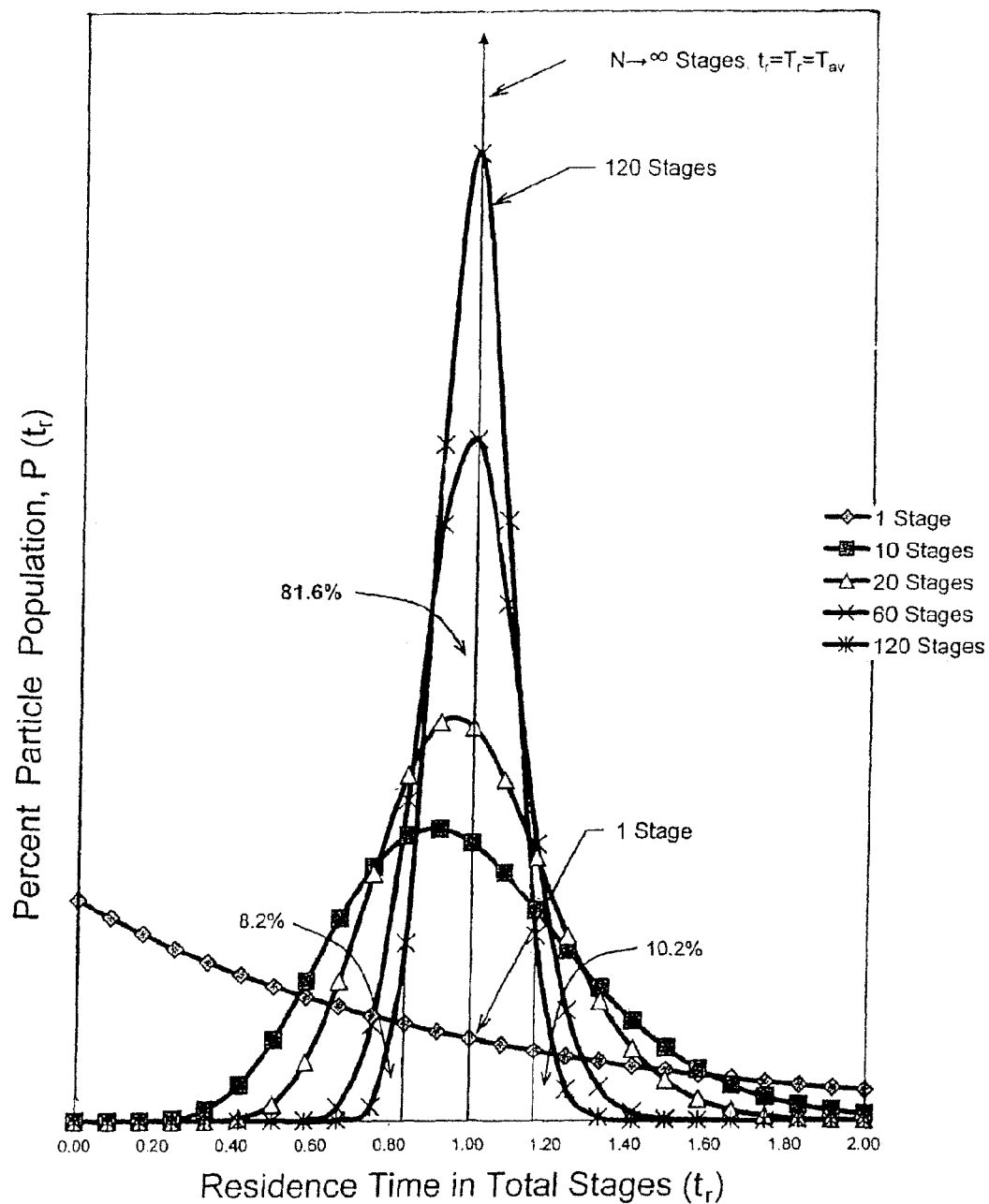
FIG. 14 is a graph showing possible residence time distributions for fluidized solids systems having various numbers of stages.

If desired, residence time uniformity can be enhanced by employing a multistage system having a larger number of stages, as can be understood from FIG. 14.

In FIG. 14 as in FIGS. 4 and 13, the actual residence time is plotted on the abscissa as a proportion of the average residence time and the ordinate is normalized for the area under the curves to be unity so that the residence time of the entire population is 1.0. FIG. 14 shows modeled-determined residence time graphs for the cases where the number of stage vessels N is equal to 10, 20, 60, and 120 stages. It can be seen from the figure that in the 120 stage case, more than 80 percent of the total particle population (81.6 percent) is between plus and minus 20 percent of the average residence time. Comparable graphs can be generated by a person of ordinary skill in the art for other numbers of stages, enabling multistage system embodiment of the invention having a suitable number of stages to be selected for a particular industrial, commercial or research application.

For example the multistage system can have at least about 15 stage vessels; from about 40 stage vessels to about 500 stage vessels; from about 100 stage vessels to about 200 stage vessels; from about 50 stage vessels to about 70 stage vessels; or from about 80 stage vessels to about 200 stage vessels and the methods of the invention can be performed in systems having such numbers of vessels.

As can be understood from this disclosure, various embodiments of the invention can have or can provide one or more of the features or benefits described in the following paragraphs.

Fabricating the lower sections of stage vessels 12 and transfer tunnels 18 from a robust, integral base plate, such as base plate 10 can be economical and can facilitate accurate positioning of the individuals stages of the multistage system with respect to one another and of the transfer tunnels with respect to stage vessels 12. Fabrication of base plate 10 as an integral or monolithic unit helps assure that proper spatial relationships of stage vessels 12 and transfer tunnels 18 are maintained during the useful life of the processing system. These measures can all contribute to the effectiveness of high volume and other embodiments of multistage system according to the invention.

Use of gas distributor plate 22, with a suitable pattern of fluidization injection nozzles 24, termed "tuyere", servicing the stage vessels as well as the transfer tunnels, can afford good solids fluidization characteristics facilitating consistent passage of the particulate solids through the system.

Because the gas pressure at the tunnel discharge can be lower than the gas pressure at a tunnel entrance, the fluidizing gas in a transfer tunnel 18 can strike the roof of the transfer tunnel and turn in the direction of flow of product through the tunnel promoting reliable operation of the transfer tunnel and reducing possible plugging or other obstruction of the tunnel with the solid particles. Surprisingly, in some embodiments of the invention, one or more gas nozzles 24 can project into the solid flow path through the tunnels, without causing tunnel blocking or obstruction, as this can be prevented by the flow of fluidization gas from the one or more gas nozzles 24 in the transfer tunnel 18.

The ability to separate gas distributor plate 22 from the system, or to open it, by unbolting gas distributor plate 22 from base plate flanges 25 provides convenient access to all the transfer tunnels 18 for cleaning and maintenance. Also, base plate 10 can employ geometry which sufficiently separates stage vessels 12 from each other as to permit circulation of a heating or cooling medium around the stage vessels, providing good heat transfer conditions to stage vessels 12 and facilitating control of processing temperatures in the stage vessels, enabling a desired temperature profile to be maintained from a first to a last stage vessel 12.

Some embodiments of the invention provide technically and economically feasible multistage methods for processing particulate solids which can be utilized with a large number of stages, for example 20, 60, 120, or hundreds of stages, for processes employing interactions between the particulate solids and a gas phase. Such inventive embodiments can, in some cases, provide good uniformity of residence time of the population of particles in the multistage reactor and a high quality output.

The invention can provide other benefits. For example, useful embodiments of the processes and systems of the invention can transfer fluidized solids reliably from one stage vessel to the next, with a low pressure drop during the transfer. Further embodiments of the invention can provide convenient access to a multiplicity of transfer tunnels connecting stage vessels together into a continuous processing system, to permit prompt cleaning or maintenance, or both, in the event of that one or more transfer tunnels should fail to operate effectively.

In addition, the invention provides embodiments wherein the stage vessels can be mounted in a system enclosure to permit convenient and controlled heating or cooling of the stage vessels by gas circulating in a common region or zone. Still further, embodiments of the invention provide a method and mechanism to gain convenient access to each of a large number of stages in a multistage fluidized solids continuous processing system for cleaning, washing, draining and maintaining the stage vessels and transfer tunnels, distributor plate, and plenum chamber, if employed.

Embodiments of multistage system according to the invention can be employed for processing a wide variety of solids materials in particulate form that can be fluidized with a gas. For example, multistage system embodiments can be employed for continuous drying, or heating, or both heating and drying of processing of sensitive materials requiring a time-temperature processing history having good uniformity of residence time.

Some products which conventionally have required repeated batch processing to meet a quality standard can be processed on a continuous basis, employing a multistage fluidized bed system embodiment of the invention.

Some useful embodiments of the invention can provide low heat losses and good energy efficiency, high product throughput, and good uniformity of residence time. The novel transfer tunnel design described herein can be employed to reduce or eliminate particle by-passing and holdback which can adversely affect residence time uniformity.

The invention includes multistage system fluidized bed processing embodiments comprising from ten to two hundred vessel stages, or other desired numbers of stages, in cost-effective mechanical designs which by employment of a removable gas distributor plate, or other comparable measures, can provide good access for cleaning the system for product changeovers or for routine maintenance.

In addition to the described embodiments of multistage system fluidized bed processing comprising a horizontally disposed array of stage vessels 12, it will be understood that the stage vessels can have bottoms inclined in the direction of particulate solids flow, or one vessel can be vertically displaced with respect to another, to promote gravitational flow through the system.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. Should there appear to be conflict between the meaning of a term as used in the written description of the invention in this specification and the usage in material incorporated by reference from another document, the meaning as used herein is intended to prevail.

Throughout the description, processes are described as having, including, or comprising specific process steps, it is contemplated that processes according to the present invention can also consist essentially of, or consist of, the recited processing steps. It should be understood that the order of steps or order for performing certain actions is immaterial so long as the invention remains operable. Moreover, two or more steps or actions may be conducted simultaneously.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A multistage system for continuous processing of fluidized particulate solids, the system comprising:
   (a) at least two stage vessels arranged side-by-side, each stage vessel comprising:
      (i) a containing wall to contain the fluidized solids;
      (ii) a solids inlet for the fluidized solids;
      (iii) a solids outlet for the fluidized solids;
      (iv) at least one gas inlet for fluidizing gas; and
      (v) a gas outlet for the fluidizing gas;
   (b) a volume extending around each stage vessel;
   (c) at least one transfer tunnel, the or each transfer tunnel connecting between two adjacent stage vessels to permit transport of fluidized solids between the two adjacent stage vessels; and
   (d) a common integral gas distributor plate extending across and forming the bottoms of the at least two stage vessels, the gas distributor plate being communicable with a fluidizing gas supply and comprising the fluidizing gas inlets of the at least two stage vessels.

2. A multistage system according to claim 1 wherein the system comprises at least ten stage vessels arranged side-by-side and the gas distributor plate extends across and forms the bottoms of a majority of the stage vessels and comprises the gas inlets of the majority of the stage vessels.

3. A multistage system for continuous processing of fluidized particulate solids, the system comprising:
   (a) at least two stage vessels arranged side-by-side, each stage vessel comprising:
      (i) a containing wall to contain the fluidized solids;
      (ii) a solids inlet for the fluidized solids;
      (iii) a solids outlet for the fluidized solids;
      (iv) at least one gas inlet for fluidizing gas; and
      (v) a gas outlet for the fluidizing gas;
   (b) at least one transfer tunnel, the or each transfer tunnel connecting between two adjacent stage vessels to permit transport of fluidized solids between the two adjacent stage vessels; and
   (c) a common integral gas distributor plate extending across and forming the bottoms of the at least two stage vessels, the gas distributor plate being communicable with a fluidizing gas supply and comprising the fluidizing gas inlets of the at least two stage vessels, wherein the at least one transfer tunnel comprises at least one transfer tunnel gas inlet for fluidizing gas.

4. A multistage system according to claim 3 wherein the system comprises at least twenty stage vessels arranged side-by-side and the gas distributor plate extends across and forms the bottoms of all the stage vessels and supports the gas inlets to all the stage vessels.

5. A multistage system according to claim 4 wherein the stage vessels are arranged in an array of parallel rows, wherein the transfer tunnels are disposed to provide a sinuous flow path for the fluidized solids through the array of stage vessels and wherein the number of transfer tunnels is one less than the number of stage vessels.

6. A multistage system according to claim 3 comprising at least fifty stage vessels arranged side-by-side wherein the at least one transfer tunnel comprises at least one transfer tunnel gas inlet for admitting fluidizing gas directly into each transfer tunnel, wherein the gas distributor plate forms the bottoms of all the stage vessels and transfer tunnels and comprises the gas inlets to all the stage vessels and transfer tunnels, the gas distributor plate optionally being monolithic.

7. A multistage system according to claim 4 comprising a unitary base plate, the unitary base plate comprising a lower portion of each stage vessel containing wall and comprising top and side walls for the or each transfer tunnel.

8. A multistage system according to claim 7 wherein the gas distributor plate extends beneath the unitary base plate and closes the bottoms of the stage vessels and the transfer tunnels, the gas distributor plate optionally being removably attachable to the unitary base plate.

9. A multistage system according to claim 4 comprising a volume extending around each stage vessel to receive temperature control fluid for controlling the temperature of the fluidized solids in the respective stage vessel.

10. A multistage system according to claim 9 comprising a temperature control fluid enclosure enclosing the volumes around the stage vessels.

11. A multistage system according to claim 10 wherein the common temperature control fluid enclosure is divided into multiple sub-regions controllable to have different temperatures, one sub-region from another sub-region.

12. A multistage system according to claim 3 wherein the gas supply comprises a plenum chamber extending beneath the at least two stage vessels and the at least one transfer tunnel to supply fluidizing gas to the gas inlets wherein each vessel gas inlet and transfer tunnel gas inlet can communicate with the plenum to receive fluidizing gas from the plenum.

13. A multistage system according to claim 4 comprising an off gas collector extending above each stage vessel to receive spent gas from each stage vessel fluidizing gas outlet for discharge from the multistage system.

14. A multistage system according to claim 3 wherein the gas distributor plate forms the bottom of the transfer tunnel and comprises the at least one transfer tunnel gas inlet.

15. A multistage system for continuous processing of fluidized particulate solids, the system comprising:
   (a) at least two stage vessels arranged side-by-side, each stage vessel comprising:
      (i) a containing wall to contain the fluidized solids;
      (ii) a solids inlet for the fluidized solids;
      (iii) a solids outlet for the fluidized solids;
      (iv) at least one gas inlet for fluidizing gas; and
      (v) a gas outlet for the fluidizing gas;
   (b) at least one transfer tunnel, each transfer tunnel connecting between two adjacent stage vessels to permit transport of fluidized solids between the two adjacent stage vessels; and
   (c) an integral base plate comprising a lower portion of each stage vessel containing wall and comprising top and side walls for the or each transfer tunnel.

16. A multistage system according to claim 15 wherein the or each transfer tunnel comprises at least one gas inlet for fluidizing gas.

* * * * *